(12) United States Patent
Hardjono

(10) Patent No.: US 6,842,449 B2
(45) Date of Patent: Jan. 11, 2005

(54) METHOD AND SYSTEM FOR REGISTERING AND AUTOMATICALLY RETRIEVING DIGITAL-CERTIFICATES IN VOICE OVER INTERNET PROTOCOL (VOIP) COMMUNICATIONS

(75) Inventor: Thomas Hardjono, Winchester, MA (US)

(73) Assignee: VeriSign, Inc., Dulles, VA (US)

( * ) Notice: Subject to any disclaimer, the term of this patent is extended or adjusted under 35 U.S.C. 154(b) by 0 days.

(21) Appl. No.: 10/190,849

(22) Filed: Jul. 9, 2002

(65) Prior Publication Data

US 2004/0008666 A1 Jan. 15, 2004

(51) Int. Cl.⁷ .............................................. H04L 12/66
(52) U.S. Cl. .................. 370/352; 370/395.52; 713/155; 709/227
(58) Field of Search ................................ 370/352, 389, 370/392, 395.5, 395.52, 395.2, 401, 465, 466; 709/203, 227, 230, 217, 218, 219; 713/151, 156, 180, 200, 201, 155; 379/88.13, 88.17

(56) References Cited

U.S. PATENT DOCUMENTS

| | | | | |
|---|---|---|---|---|
| 2002/0112187 A1 | * | 8/2002 | Dalton et al. | 713/201 |
| 2002/0129236 A1 | * | 9/2002 | Nuutinen | 713/151 |
| 2002/0184182 A1 | * | 12/2002 | Kwan | 707/1 |
| 2003/0031165 A1 | * | 2/2003 | O'Brien | 370/352 |
| 2003/0061356 A1 | * | 3/2003 | Jason | 709/227 |

* cited by examiner

Primary Examiner—Brian Nguyen
(74) Attorney, Agent, or Firm—Kenyon & Kenyon

(57) ABSTRACT

A method and system for registering and automatically retrieving digital-certificates in voice over Internet protocol (VOIP) communications. In accordance with an embodiment of the present invention, the method includes receiving a digital voice call setup request with an associated caller certificate from a caller and determining a location of a called party identified in the digital voice call setup request. The method also includes transmitting the digital voice call setup request with the caller certificate to the called party and receiving a called party acceptance message. The method further includes verifying the called party acceptance message and transmitting the called party acceptance message and a called party certificate to the caller.

40 Claims, 11 Drawing Sheets

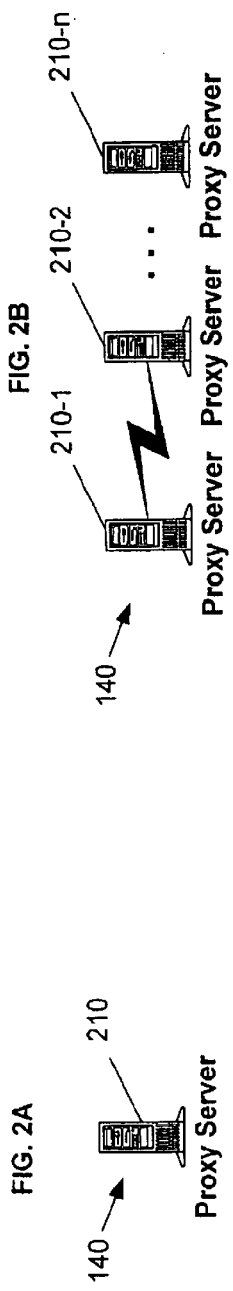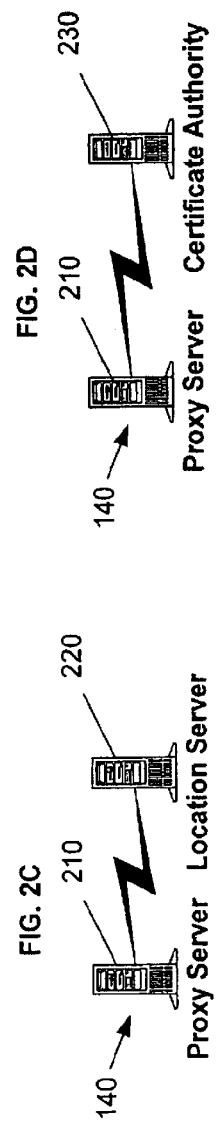

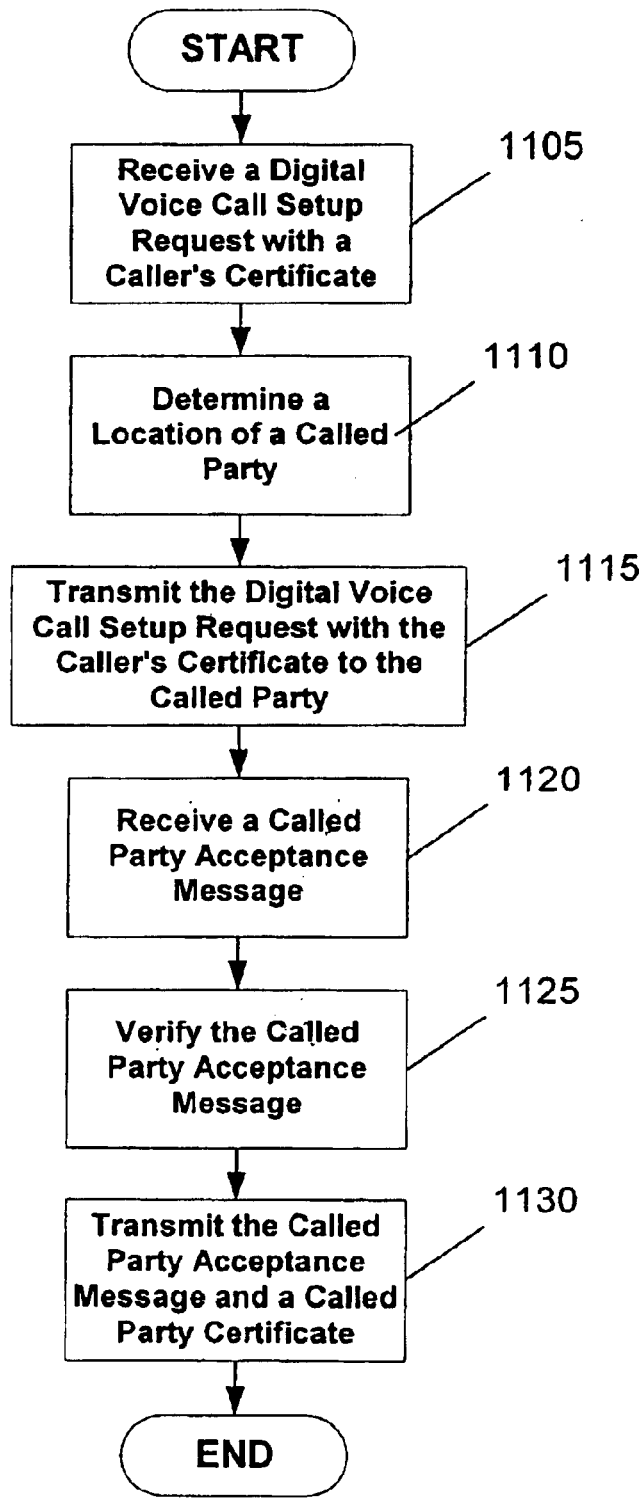

METHOD AND SYSTEM FOR REGISTERING AND AUTOMATICALLY RETRIEVING DIGITAL-CERTIFICATES IN VOICE OVER INTERNET PROTOCOL (VOIP) COMMUNICATIONS

TECHNICAL FIELD

The present invention relates to computer communication systems. More specifically, the present invention relates to a method and system for registering and automatically retrieving digital-certificates in voice over Internet protocol (VOIP) communications.

BRIEF DESCRIPTION OF THE DRAWINGS

FIGS. 2A through 2E are block diagrams that illustrate alternate configurations of automatic certificate retrieval systems capable of performing either or both of certificate registration and retrieval, in accordance with an embodiment of the present invention.

FIG. 11 is a detailed flow diagram that illustrates a method of automatic certificate retrieval/forwarding and revocation in a VOIP communications, in accordance with an embodiment of the present invention.

DETAILED DESCRIPTION

Figure 1:
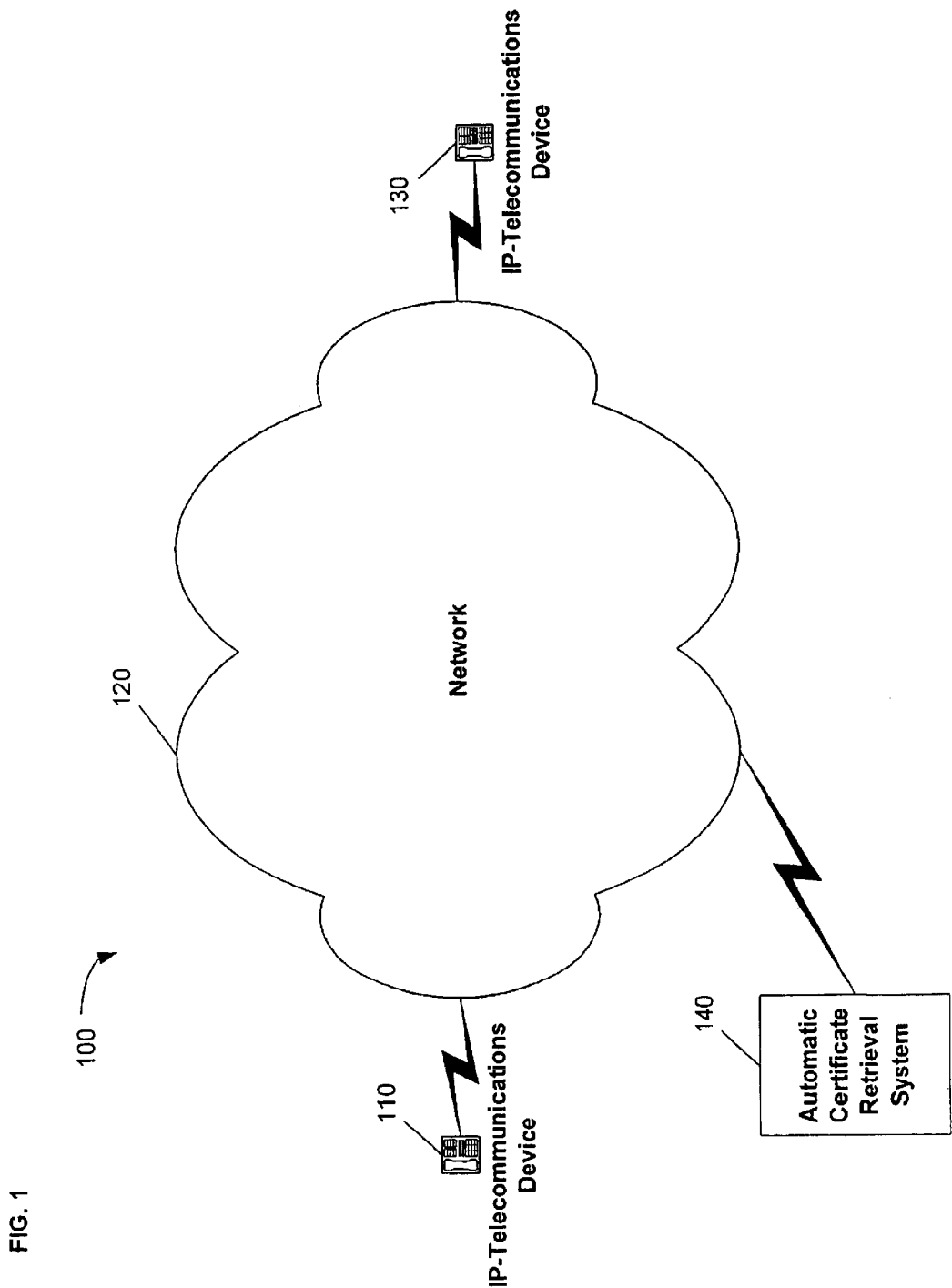
FIG. 1 is a system block diagram of a voice over Internet protocol (VOIP) communication system having certificate registration and automatic certificate retrieval, in accordance with an embodiment of the present invention.

FIG. 1 is a system block diagram of a voice over Internet protocol (VOIP) communication system 100 having certificate registration and automatic certificate retrieval, in accordance with an embodiment of the present invention. Generally, communication system 100 may include a calling IP-telecommunication device 110 coupled to a network 120 (for example, the Internet, a local area network (LAN), a wide area network (WAN), an Intranet, and the like), a called IP-telecommunication device 130 also coupled to network 120, and an automatic certificate retrieval system 140 coupled to network 120. For example, calling IP-telecommunication device 110 and called IP-telecommunication device 130 may each be an Internet-enabled land-line and/or a wireless telephone, personal computer equipped with a headset/telephone interface, personal digital assistant (PDA), and/or other hand held device. Both may include an operating system (OS) and, if necessary, a separate VOIP communication application program. For example, a VOIP-enabled telephone may only have an OS while a PC with headset/telephone interface may have a separate OS and a separate VOIP communication application program. Similarly, the designation of IP-telecommunication device 110 as the calling device and IP-telecommunication device 130 as the called device is merely exemplary of one embodiment of the present invention, it should be clearly understood that IP-telecommunication device 130 may just as easily call IP-telecommunication device 110. Automatic certificate retrieval system 140 may receive, from a caller, periodic requests having a caller certificate to establish a digital voice call over network 120. In response to each request, automatic certificate retrieval system 140 may determine a location of a called party, for example, an electronic address, such as, an IP address of the called party, identified in the digital voice call setup request and transmit the digital voice call setup request with the caller certificate to the called party. Automatic certificate retrieval system 140 also may receive an acceptance message from the called party, verify the called party acceptance message and transmit the called party acceptance message with a called party certificate to the caller.

In accordance with embodiments of the present invention, automatic certificate retrieval system 140 may be implemented using a variety of configurations, for example, automatic certificate retrieval system 140 may be implemented as an integrated and/or distributed system.

FIGS. 2A through 2E are block diagrams that illustrate alternate configurations of automatic certificate retrieval system 140 that are capable of performing either or both of the certificate registration and certificate retrieval functions, in accordance with an embodiment of the present invention. In FIG. 2A, automatic certificate retrieval system 140 may be implemented as a single proxy server 210, which, in general, may perform some or all of the functions necessary to retrieve and forward the caller and called party certificates during call setup. For example, in the embodiment in FIG. 2A, proxy server 210 may be implemented to store the certificates locally for quick retrieval and/or to retrieve the certificates and/or location information from one or more remote locations. Similarly, in FIG. 2B, automatic certificate retrieval system 140 may be implemented as a group of proxy servers 210-1, 210-2, ..., 210-n, where n≧2 and, in general, proxy servers 210-1, 210-2, ..., 210-n may perform some or all of the functions necessary to retrieve and forward the certificates during call setup. As described above in relation to FIG. 2A, proxy servers 210-1, 210-2, ..., 210-n may also be implemented to store the certificates locally for quick retrieval and/or to retrieve the certificates and/or location information from one or more remote locations, for example, other proxy servers not in the group.

In FIG. 2C, automatic certificate retrieval system 140 may be implemented with proxy server 210 being in communication with a location server 220, which may be either local or remote from proxy server 210, in accordance with an embodiment of the present invention. In general, proxy server 210 and location server 220 may, individually or in combination, perform some or all of the functions necessary to retrieve and forward the caller and called party certificates during call setup. For example, location server 220 may store the IP addresses of the caller and called party and may provide the IP addresses to proxy server 210. As with the embodiments in FIG. 2A and FIG. 2B, the embodiment of the present invention in FIG. 2C may be implemented to store the certificates locally for quick retrieval and/or to retrieve the certificates and/or location information from one or more remote locations, for example, other proxy servers and/or location servers.

In FIG. 2D, automatic certificate retrieval system 140 may be implemented with proxy server 210 being in communication with a certificate authority 230, which may be either local or remote from proxy server 210, in accordance with an embodiment of the present invention. Certificate authority 230 may issue and manage security credentials and public keys for message encryption. As part of issuing security credentials, certificate authority 230 may issue individual digitally signed, digital certificates with the necessary security credential, public key and other information, for both the caller and the called party. In general, proxy server 210 and certificate authority 230 may, individually or in combination, perform some or all of the functions necessary to retrieve and forward the caller and called party certificates during call setup. As in FIG. 2A through FIG. 2C, the embodiment of the present invention in FIG. 2D may be implemented to store the certificates at certificate authority 230 and/or proxy server 210 and/or to retrieve the certificates and/or location information from one or more remote locations, for example, other proxy servers, certificate authorities, and/or location servers.

In FIG. 2E, automatic certificate retrieval system 140 may be implemented with proxy server 210, location server 220 and a certificate authority 230 all being in communication with each other. As previously described, location server 220 and certificate authority 230 may each be either local or remote from proxy server 210, in accordance with an embodiment of the present invention. In general, proxy server 210, location server 220 and certificate authority 230 may, individually or in combination, perform some or all of the functions necessary to retrieve and forward the caller and called party certificates during call setup. As with the embodiments in FIG. 2A through FIG. 2D, the embodiment of the present invention in FIG. 2E may be implemented to store the certificates at certificate authority 230 and/or proxy server 210 and/or to retrieve the certificates and/or location information from one or more remote locations, for example, other proxy servers, certificate authorities, and/or location servers.

Figure 3:
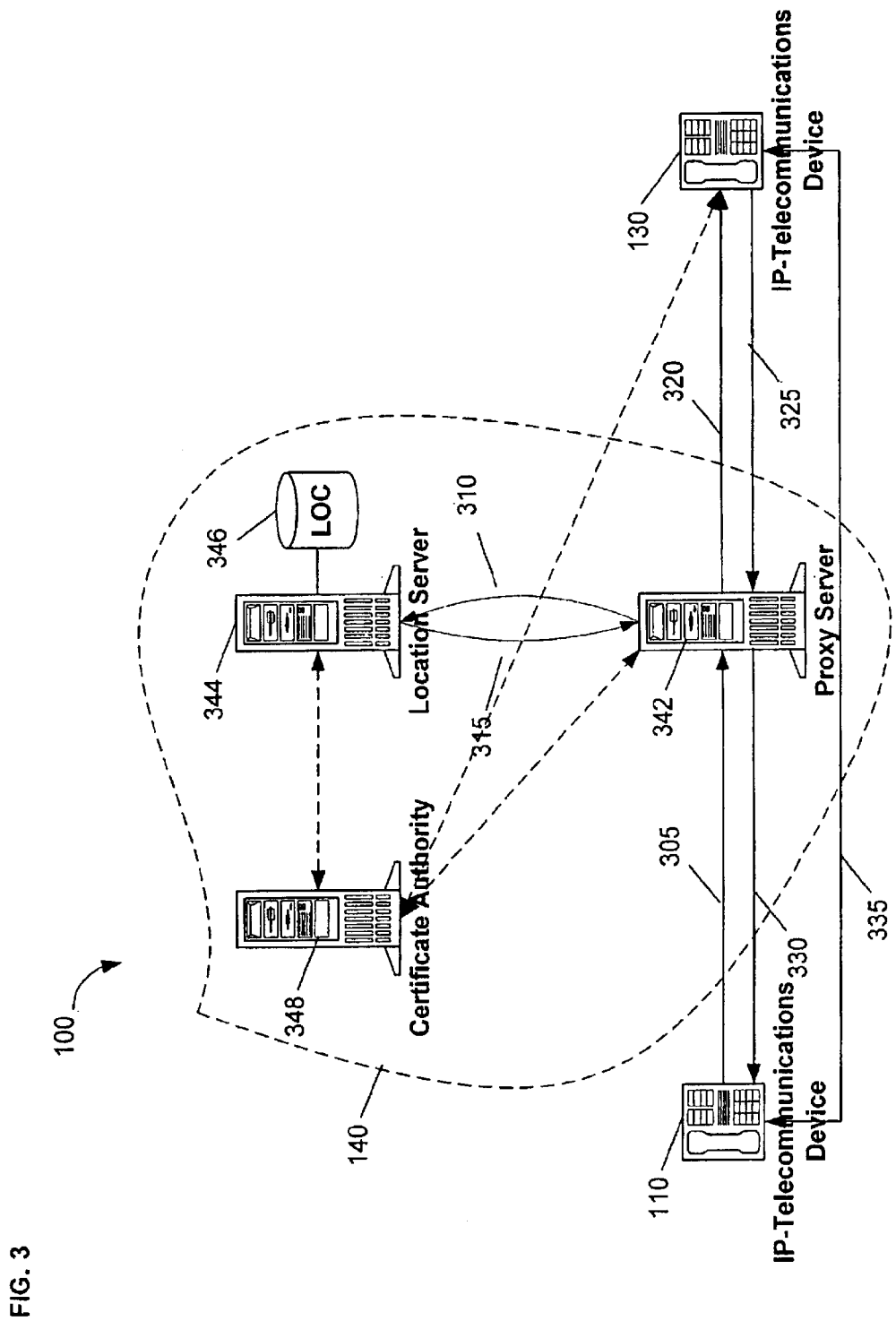
FIG. 3 is a system block diagram of a digital certificate registration and automatic certificate retrieval in voice over Internet protocol (VOIP) communications system, in accordance with an embodiment of the present invention.

FIG. 3 is a system block diagram of communication system 100 for providing digital certificate registration and automatic certificate retrieval in VOIP communications, in accordance with an embodiment of the present invention. In FIG. 3, automatic certificate retrieval system 140 is shown implemented as the embodiment illustrated in FIG. 2E, in which a proxy server 342 may be in communication with a location server 344 having an associated location database 346 and in communication with a certificate authority 348. Similarly, location server 344 and certificate authority 348 may be in communication with each other. Proxy server 342 may also be in communication with calling IP-telecommunication device 110 and called IP-telecommunication device 130, and calling IP-telecommunication device 110 and called IP-telecommunication device 130 may be in direct communication with each other. In general, all communications between the components of automatic certificate retrieval system 140 may be two-way.

To illustrate the operation of communication system 100, a description of what occurs if a caller calls a called party, follows in relation to FIG. 3. In accordance with an embodiment of the present invention, in FIG. 3, proxy server 342 may be implemented as a Session Initiation Protocol (SIP) proxy server 342 as the entity that mediates a call from calling IP-telecommunication device 110 to called IP-telecommunication device 130. SIP is currently defined in a draft Internet Engineering Task Force (IETF) working document, reference number: draft-ietf-sip-rfc2543bis-08ps, dated Feb. 21, 2002, as "an application-layer control (signaling) protocol for creating, modifying and terminating sessions with one or more participants. Since SIP proxy server 342 may handle signaling for the call, it may also represent a suitable entity to mediate the retrieval of the certificates corresponding to the caller and called party. However, as described above, other entities may also be used to retrieve the certificates.

In FIG. 3, a call request may be sent from calling IP-telecommunication device 110 to SIP proxy server 342 along a first communication path 305, for example, in the SIP context, as a SIP Invite-message. However, unlike ordinary SIP Invite-messages, the SIP Invite-message of the present embodiment may contain a certificate from calling IP-telecommunication device 110, and the SIP Invite-message may be digitally-signed by calling IP-telecommunication device 110. The SIP Invite-message may be received/intercepted by SIP proxy server 342, and SIP proxy server 342 may query location server 344 along a second communication path 310 for the current location, that is, the IP address, of called IP-telecommunication device 130. Similarly, the query to location server 344 may be digitally signed by SIP proxy server 342 to prevent denial of service attacks against location server 344. Location server 344 may be assumed to be in possession of the certificate from SIP proxy server 342, and may optionally verify the signature of SIP proxy server 342 on the query.

In response to the query from SIP proxy server 342, location server 344 may return a called location, for example, an IP address, for called IP-telecommunication device 130 along a third communication path 315. Likewise, location server 344 may also return a certificate for the called IP-telecommunication device 130 and a certificate for calling IP-telecommunication device 110 as known by location server 344. The entire message may be digitally signed by location server 344 to indicate that the certificates contained in the message were valid at the time of the signing of the response message. Generally, location server 344 may return valid certificates for calling IP-telecommunication device 110 and called IP-telecommunication device 130. Location server 344 may verify its own copy of the certificates for calling IP-telecommunication device 110 and called IP-telecommunication device 130 against an online certificate status protocol (OCSP) responder/certificate authority or other certificate status services (not shown) or simply obtain the current certificates from certificate authority 348. OCSP is a more recent scheme for maintaining the security of network resources, for example, proxy server 210. If location server 344, in FIG. 3, cannot obtain a current valid certificate for calling IP-telecommunication device 110 and called IP-telecommunication device 130, then location server 344 may not return anything to SIP proxy server 342 along third communication path 315. This certificate lookup by the Location Server can be based on one or more attributes regarding the caller and the called party, for example, email addresses, known by location server 344.

In accordance with another embodiment of the present invention, location server 344 itself may in fact be an OCSP Responder/certificate authority and/or some kind of a certificate revocation list (CRL) Repository. A CRL is the older method for maintaining the security of network resources, and does so by keeping a list of users identified with the status of that user's digital certificate and allowing or denying access based on the status of the user's digital certificate.

Continuing the SIP embodiment for the VOIP call, in FIG. 3, SIP proxy server 342 may forward a message with the original SIP-Invite from calling IP-telecommunication device 110 to called IP-telecommunication device 130 and the valid certificate for calling IP-telecommunication device 110 that was returned by location server 344 along a fourth communication path 320. SIP proxy server 342 need not send called IP-telecommunication device 130 a copy of it's own certificate, since called IP-telecommunication device 130 already has it's own certificate. The entire message may be signed by SIP proxy server 342.

Once called IP-telecommunication device 130 indicates it is willing to take the call, called IP-telecommunication device 130 responds with an OK-message that may be digitally signed by called IP-telecommunication device 130. Upon intercepting the called IP-telecommunication device 130 OK response, the SIP Proxy Server 342 may verify the signature on the message, using either the certificate attached to the OK-message by called IP-telecommunication device 130 or, if there is no certificate attached, using the copy of the certificate for called IP-telecommunication device 130 that SIP Proxy Server 342 previously obtained from Location Server 344.

Two things that may occur during validation of the signature of called IP-telecommunication device 130 by SIP Proxy Server 342 include the following. First, if called IP-telecommunication device 130 attached a certificate to the OK-message and the signature was verified successfully using that certificate, then SIP Proxy Server 342 may compare that certificate with the copy that SIP Proxy Server 342 recently obtained from Location Server 344. If the certificates are identical, then SIP Proxy Server 342 may forward the certificate of called IP-telecommunication device 130 to calling IP-telecommunication device 110. If, however, the certificate is not identical, SIP Proxy Server 342 may then verify the status of the certificate supplied by called IP-telecommunication device 130 in the OK-message, for example, against an OCSP Responder. If the status-verification returns positive (i.e. certificate valid) then all is well and SIP Proxy Server 342 may forward the certificate of called IP-telecommunication device 130 to calling IP-telecommunication device 110. If, for example, the OCSP Responder returns a negative, that is, the certificate is invalid, then SIP Proxy Server 342, may return an error message, for example, a Valid-Certificate-Not-Present to calling IP-telecommunication device 110, indicating that either called IP-telecommunication device 130 must sign the OK-message with a valid certificate or that a valid certificate must be attached to the OK-message.

Second, if called IP-telecommunication device 130 did NOT attach a certificate to the OK-message and the signature was verified successfully using the copy of called IP-telecommunication device's 130 certificate at SIP Proxy Server 342, that is, the certificate previously obtained from Location Server 344, then SIP Proxy Server may forward this certificate, which was issued to called IP-telecommunication device 130, to calling IP-telecommunication device 110. This implies that called IP-telecommunication device 130 is honest and its certificate is current/valid.

Once SIP Proxy Server 342 is in possession of a valid called IP-telecommunication device 130 certificate, SIP Proxy Server 342 may then return called IP-telecommunication device's 130 certificate to calling IP-telecommunication device 110.

Upon receipt of a copy of called IP-telecommunication device's 130 certificate, calling IP-telecommunication device 110 may send an acknowledgment (ACK) message to called IP-telecommunication device 130 indicating that the call can proceed. Calling IP-telecommunication device 110 may also use the public key of called IP-telecommunication device 130 to negotiate other keying material for subsequent conversations.

Figure 4:
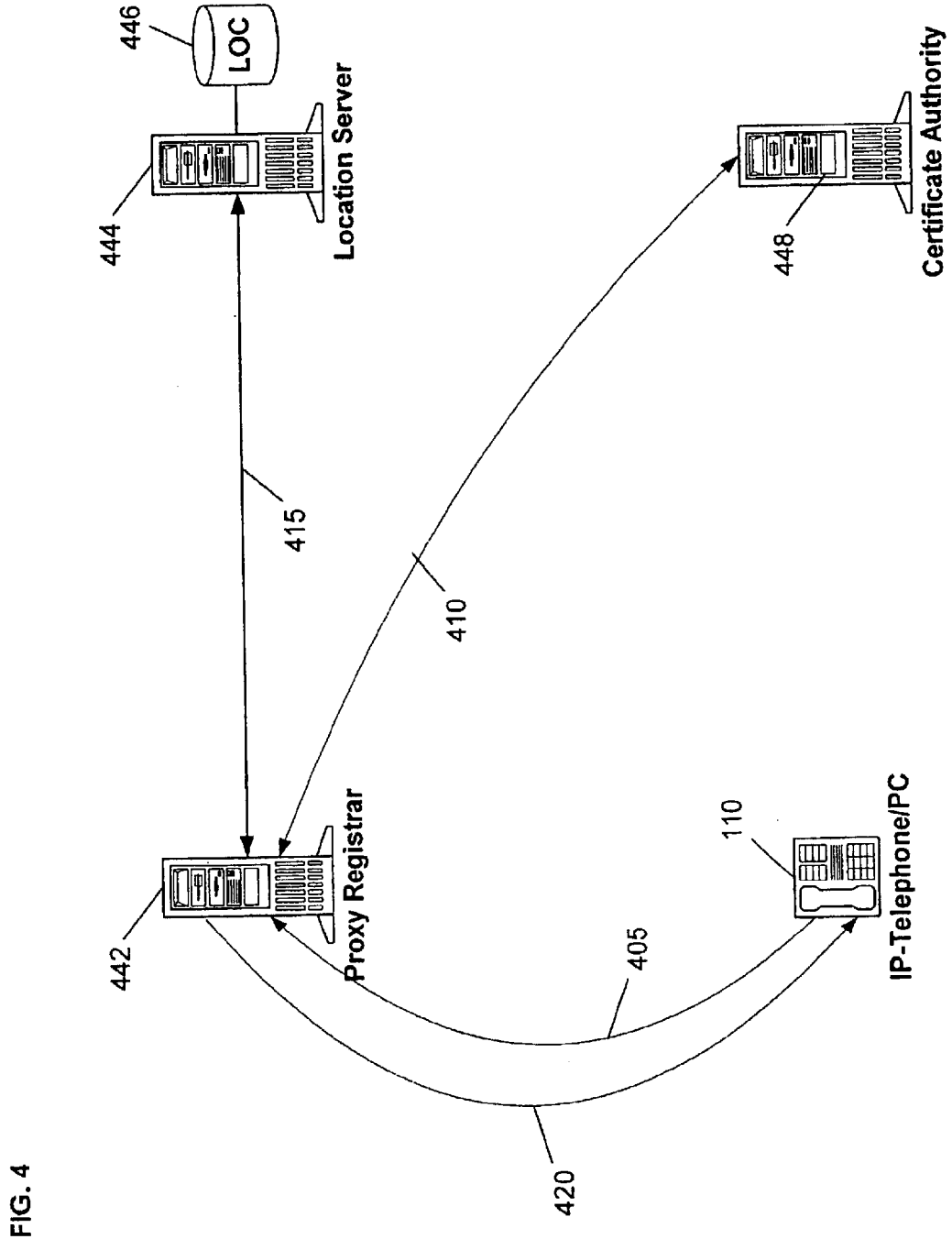
FIG. 4 is a system block diagram of a certificate registration and automatic certificate retrieval system that illustrates certificate registration and automatic retrieval/forwarding and revocation in a VOIP communication, in accordance with an embodiment of the present invention.

FIG. 4 is a system block diagram of a certificate registration and automatic certificate retrieval system that illustrates certificate registration and automatic retrieval/forwarding and revocation in a VOIP communication, in accordance with an embodiment of the present invention. In FIG. 4, calling IP-telecommunications device 110 may be coupled to a proxy registrar 442, which may be coupled to a location server 444 and a certificate authority 448. Location server 444 may be coupled to location database 446. Continuing with the SIP system embodiment described in FIG. 3, the system in FIG. 4, shows an embodiment of how certificate registration and automatic retrieval/forwarding and revocation may occur in the context of a VOIP call. Specifically, proxy registrar 442 may be a SIP proxy registrar 442.

In FIG. 4, in accordance with an embodiment of the present invention, a user may register from calling IP-telecommunication device 110, by sending a register-message along a first communication path 405 to SIP proxy registrar 442, which may also act as the SIP proxy server. In general, a communications path may be defined as a logical connection between a given source and destination that may traverse the same or different physical paths. The register-message, in general, may contain the user's number and location, that is, IP address, information, as well as, a user public-key certificate. The entire register-message may also be signed by the user. In general, having the register-message signed by the user provides a higher degree of confidence that the user is who the user claims to be.

In FIG. 4, SIP proxy registrar 442 may verify that the identity provided in the certificate matches the identity that the user claims to be. SIP proxy registrar 442 may also verify the digital signature of the register-message. SIP proxy registrar 442 may further verify the validity of the certificate by verifying it with a certificate status service, for example, along a second communication path 410 to certificate authority 448.

SIP proxy registrar 442 may send a message along a third communication path 415 to inform location server 444 of the presence/location of the user and the user's public key certificate. The message from SIP proxy registrar 442 may also be signed by SIP proxy registrar 442 using its own digital certificate. SIP proxy registrar 442 may then bind not only the user's name/identity, for example, an email address, to the user's location (for example, an IP address), but also to the user's validated certificate.

In FIG. 4, SIP proxy registrar 442 may return an OK message to the user at calling IP-telecommunication device 110 along a fourth communication path 420, to indicate the successful completion of the registration process. Similarly, if the registration process is unsuccessful, SIP proxy registrar 442 may return an error message to the user at calling IP-telecommunication device 110 along fourth communication path 420, to indicate the failure of the registration process. If the registration process is unsuccessful, the user may retry the entire registration process. The same registration process may also occur between any IP-telecommunications device coupled to the system, for example, called IP-telecommunications device 130. The illustration of first communications path 405 and fourth communications path 420 as being separate paths is merely to aid in the description of the method of the present embodiment. As such, it should be clearly understood that single, two-way communication paths may also be used, for example, first communication path 405 and fourth communication path 420 may be implemented as a single, two-way communication path.

Figure 5:
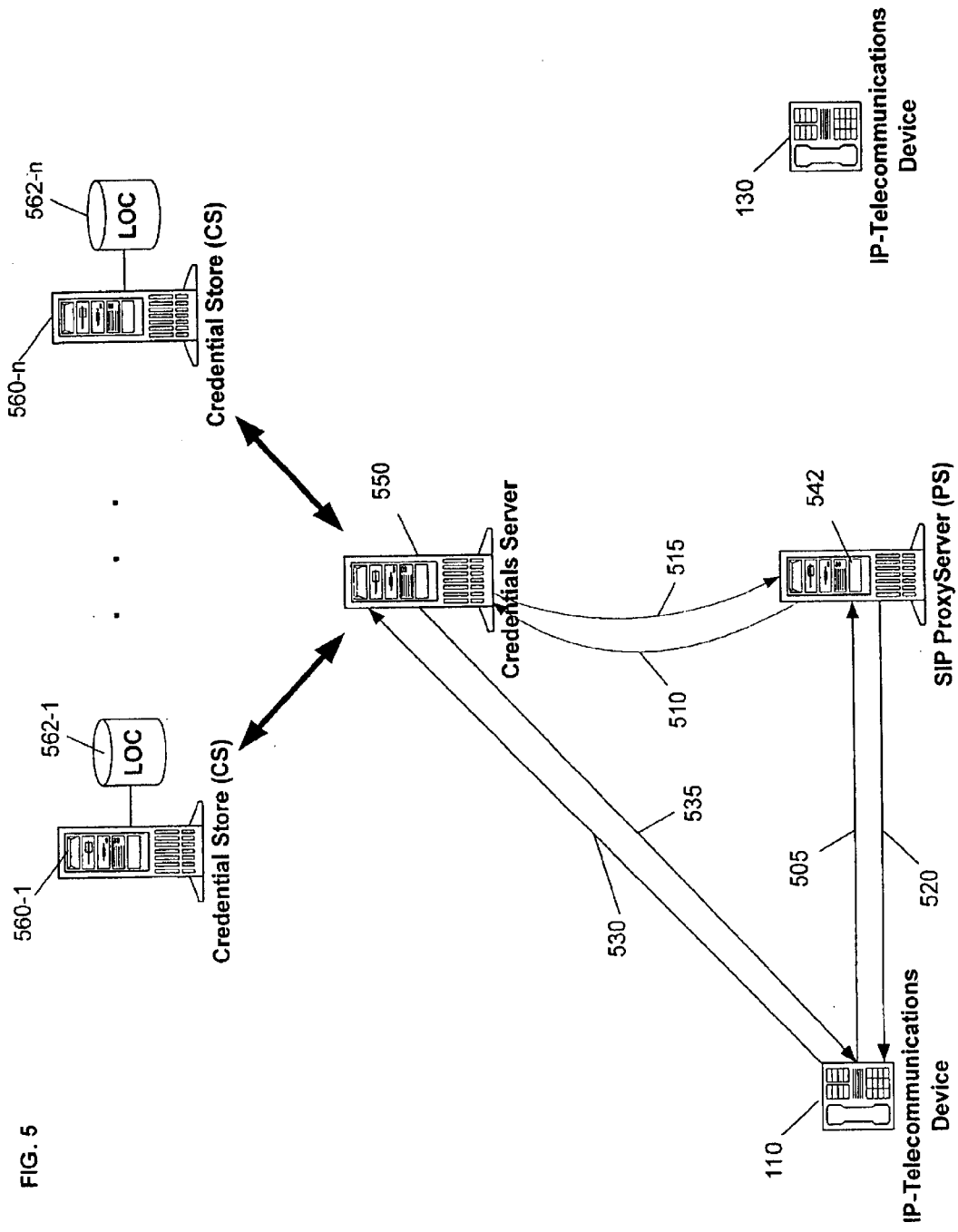
FIG. 5 is a system block diagram of a VOIP communication system shown to illustrate two possible methods for a user to download credentials, in accordance with embodiments of the present invention.

FIG. 5 is a system block diagram of a VOIP communication system shown to illustrate two possible methods for a user to download credentials, for example, digital certificates, in accordance with embodiments of the present invention. In general, in FIG. 5, calling IP-telecommunication device 110 may download its credentials as part of initiating a call to a called IP-telecommunication device 130. This may be accomplished by enabling calling IP-telecommunication device 110 to receive an optional entry, as described above in relation to FIG. 4, by a caller that would trigger the retrieval of the caller's encrypted credentials. In FIG. 5, to complete the retrieval of the caller's encrypted credentials, the caller may enter the caller's secret PIN number or password or preset a token at calling IP-telecommunication device 110, which may decrypt and load the caller's credentials to a volatile storage (not shown), for example, a memory, of calling IP-telecommunication device 110. A token may be a hardwared device, for example, a smart card, that is useful in authenticating its bearer. In accordance with embodiments of the present invention, at the completion of the VOIP call, calling IP-telecommunication device 110 may automatically erase the credentials from its volatile storage (memory).

In accordance with an embodiment of the present invention, the download of the caller's credentials may be accomplished using a proxy server 542, for example, a SIP proxy server 542, as an intermediate to obtain the requested user credentials from a credentials server 550 along a first communication path 505. SIP proxy server 542 in-turn may obtain the encrypted pieces of the credentials from credentials server 550 along a second communication path 510. Credentials server 550 in turn may obtain the encrypted pieces from an associated credentials store 560-1 . . . 560-n, where each associated credentials store 560-1 . . . 560-n may be coupled to a location database 562-1 . . . 562-n, respectively. Credentials server 550 may send the obtained encrypted pieces of the credentials along a third communication path 515 to SIP proxy server 542, which in turn may send the encrypted pieces of the credentials along communication path 520 to calling IP-telecommunication device 110. The illustration of communication paths 505, 510, 515 and 520 as being separate paths is merely to aid in the description of the method of the present embodiment. As such, it should be clearly understood that single, two-way communication paths may also be used, for example, first communication path 505 and fourth communication path 520 may be implemented as a single, two-way communication path and second communication path 510 and third communication path 515 may be implemented as another single, two-way communication path.

In accordance with another embodiment of the present invention, in FIG. 5, the credentials download may be accomplished directly using calling IP-telecommunication device 110 to download the credentials from credentials server 550 along a fifth communication path 530. As in the previously described embodiment, credentials server 550 in turn may obtain the encrypted pieces of the credentials from associated credentials store 560-1 . . . 560-n, and location databases 562-1 . . . 562-n, respectively. Credentials server 550 may send the obtained encrypted pieces of the credentials along a sixth communication path 535 to calling IP-telecommunication device 110. As in the previous embodiment, the illustration of communication paths 530 and 535 as being separate paths is merely to aid in the description of the method of the present embodiment. As such, it should be clearly understood that a single, two-way communication path may also be used, for example, fifth communication path 530 and sixth communication path 535 may be implemented as a single, two-way communication.

In accordance with yet another embodiment of the present invention, the certificate registration system described in FIG. 1 may also be used to store credentials via SIP proxy server 342.

Figure 6:
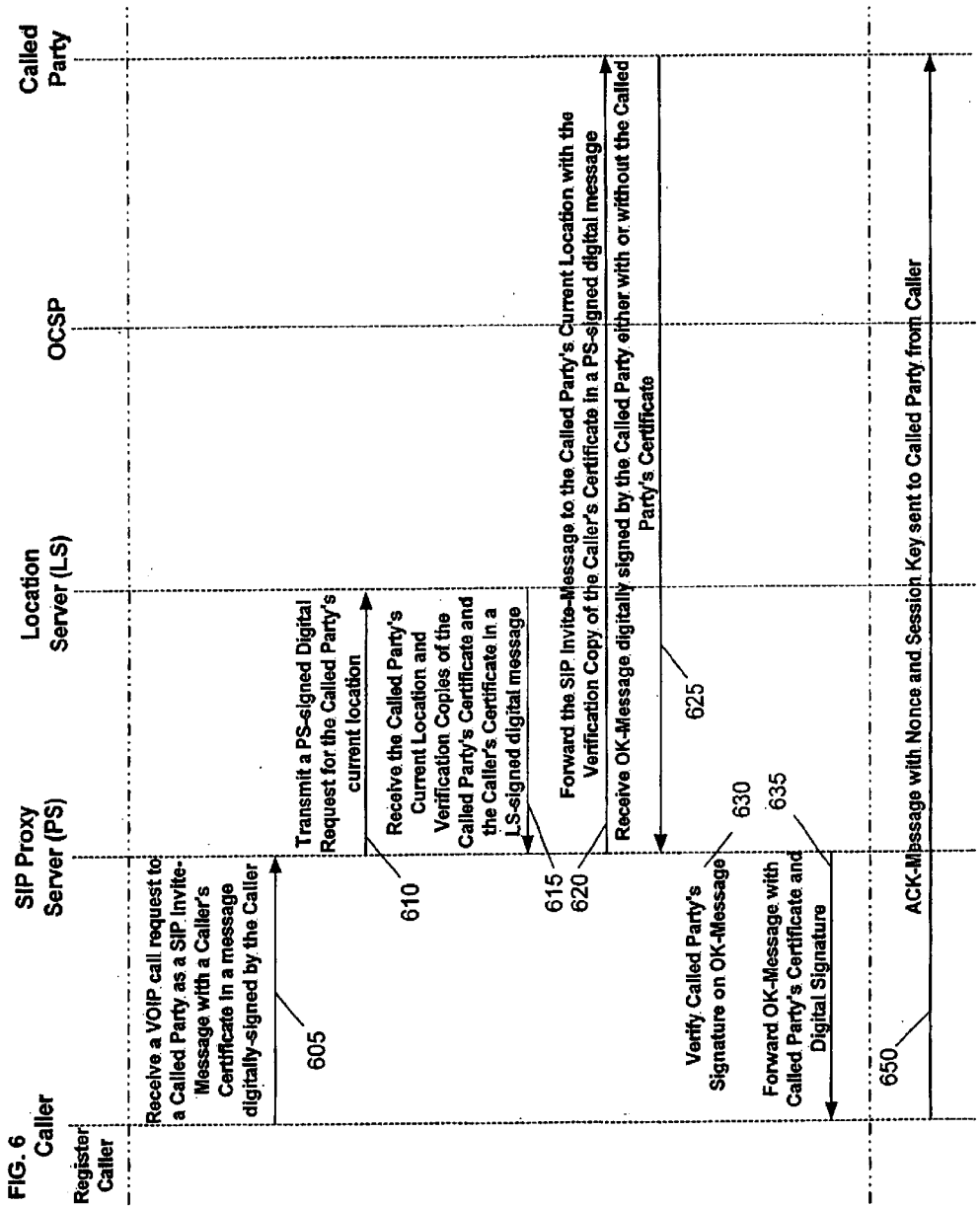
FIG. 6 is a detailed process flow diagram that illustrates a method of providing digital certificate registration and automatic certificate retrieval in VOIP communications, in accordance with an embodiment of the present invention.

FIG. 6 is a detailed process flow diagram that illustrates a method of automatic certificate retrieval/forwarding and revocation in a VOIP communication, in accordance with an embodiment of the present invention. In FIG. 6, in accordance with an embodiment of the present invention, a VOIP call request to a called party may be received (605) at a SIP proxy server as a SIP-Invite message with a caller's certificate in a message that may be digitally signed by the caller. The SIP proxy server may transmit (610) a proxy server (PS)-signed digital request for a current location of the called party. The request for the called party's current location may be sent to a location server. The proxy server may receive (615) the location of the called party along with verification copies of the called party's certificate and the calling party's certificate in a location server (LS)-signed digital message from the location server. The verification copies of the certificates may be obtained by verifying the copies of the certificates at the location server against an OCSP responder or other certificate status service. Similarly, the verification copies of the certificates may be obtained from whichever certificate authority/authorities that has/have a copy of the certificates and, in fact, the location server may act as the OCSP responder and/or CRL repository.

In FIG. 6, in accordance with an embodiment of the present invention, the SIP invite-message may be forwarded (620) from the SIP proxy server to the called party's current location with the verification copy of the caller's certificate in a digital message. The digital message may be signed by the SIP proxy server. In response, a digital OK-message from the called party may be received (625) by the SIP proxy server either with or without the called party's certificate. The digital OK-message may be signed by the called party. The called party's signature on the OK-message may be verified (630) upon receipt by the SIP proxy server. The OK-message, called party's certificate and digital signature may be forwarded (635) from the SIP proxy server to the calling party.

In FIG. 6, upon receipt of the OK-message, called party's certificate and digital signature from the SIP proxy server, the calling party may send (650) an acknowledgement message (ACK-message) with Nonce and a session key to the called party to complete the call. The call may continue between the calling party and called party until one or both discontinue the call.

Figure 7:
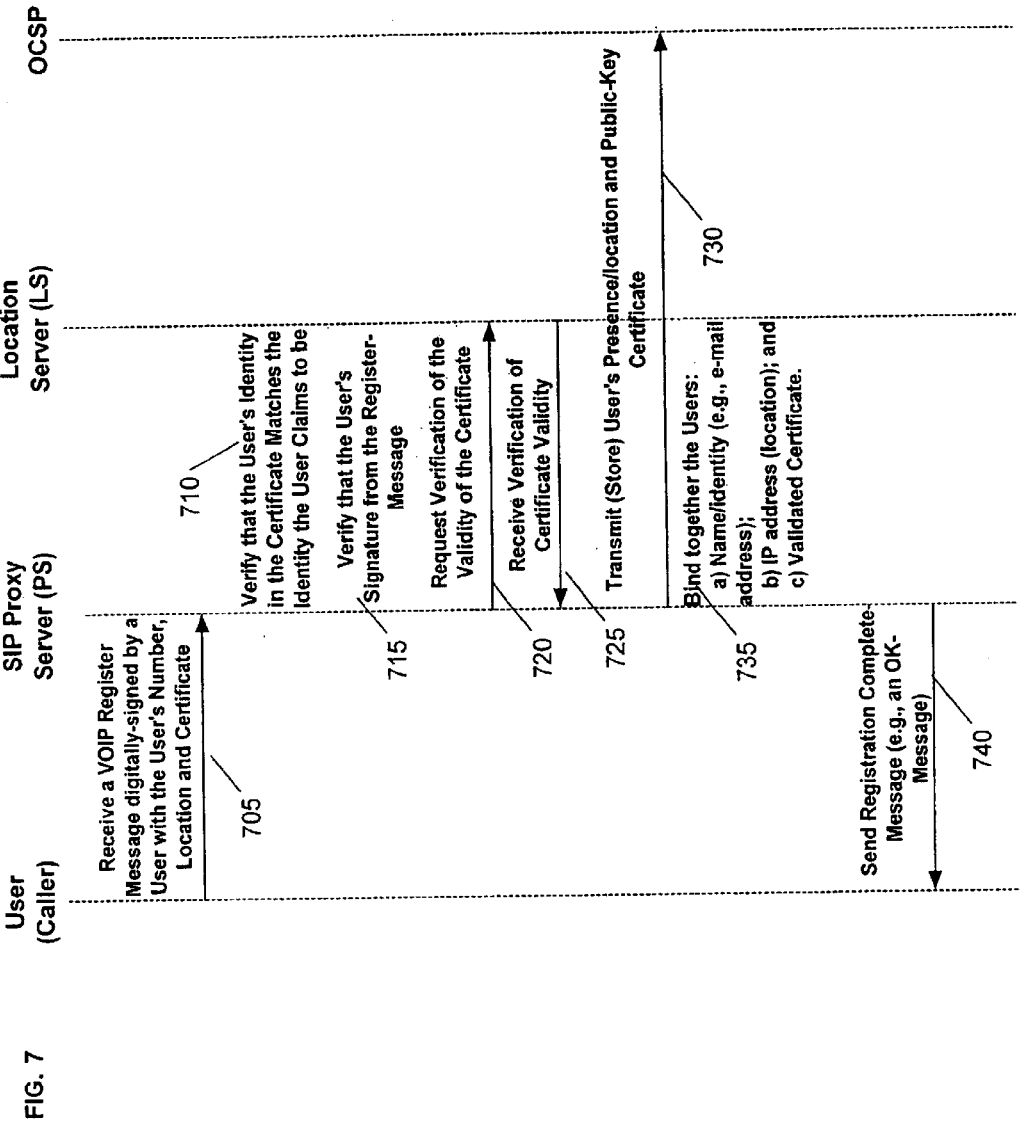
FIG. 7 is a detailed process flow diagram that illustrates a method of providing digital certificate registration in VOIP communications, in accordance with an embodiment of the present invention.

FIG. 7 is a detailed process flow diagram that illustrates a method of certificate registration in a VOIP communication, in accordance with an embodiment of the present invention. In FIG. 7, a digitally-signed VOIP register-message from a user having a user's number, location and certificate may be received (705) by a SIP proxy server. The SIP proxy server may verify (710) that the user's identity in the certificate matches the identity claimed by the user. The SIP proxy server may also verify (715) the user's signature in the register-message. The SIP proxy server may request verification (720) of the validity of the user's certificate and receive the requested verification (725) of the user certificate's validity from a location server. The user's presence/location information and public-key certificate may be transmitted (730) to an OCSP. The OCSP may be a certificate authority and/or a CRL and the transmission may be signed by the SIP proxy server with its own certificate. The proxy server may bind (735) together the user's name/identity (for example, an e-mail address), the user's location (for example, an IP address), and the validated certificate. A registration complete message, for example, an OK-message, may be sent (740) from the SIP proxy server to the user, if the registration process is successful.

As described above, the registration process illustrated in FIG. 7 may be done either prior to or concurrent with a call initiation request from a user.

Figure 8:
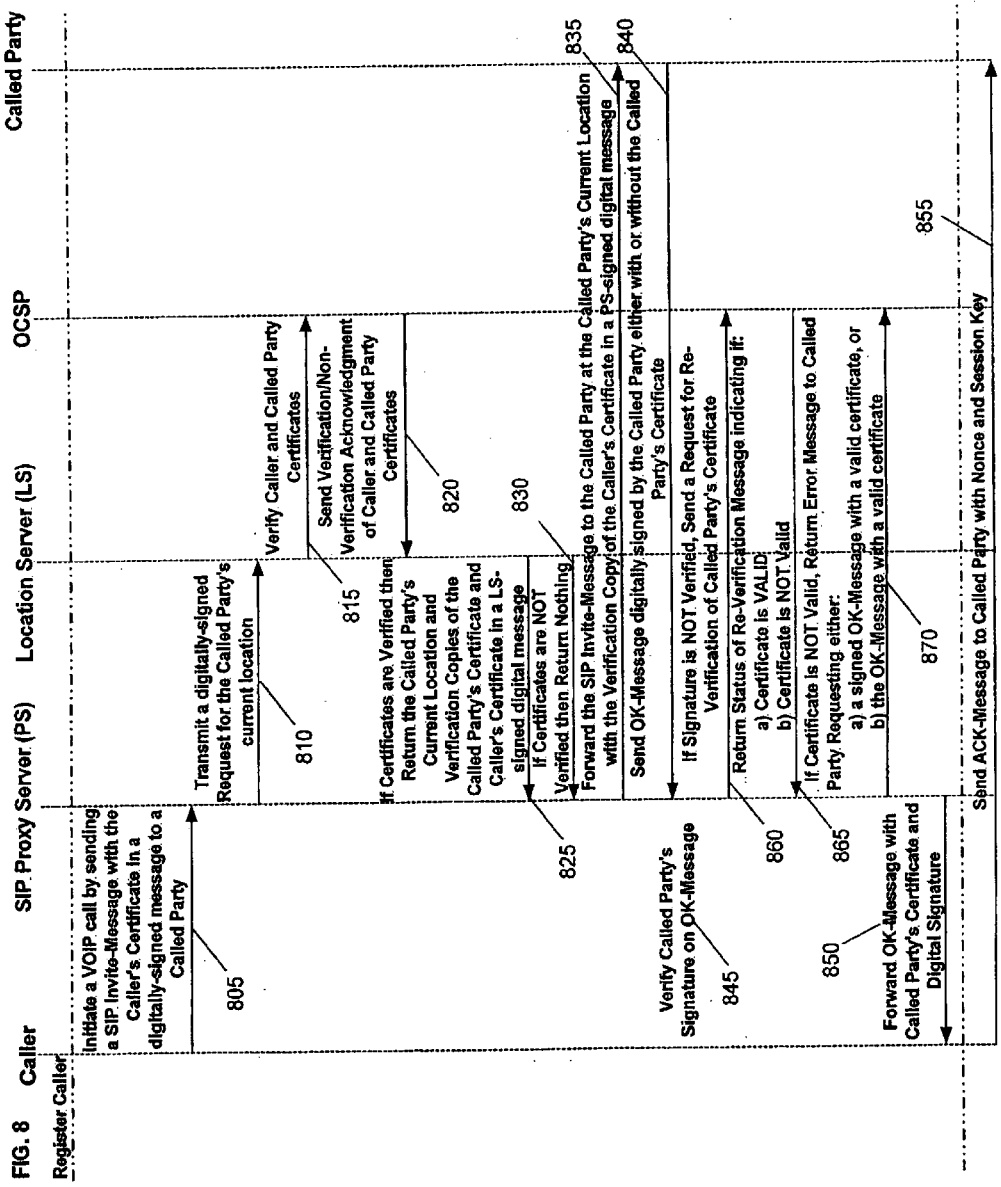
FIG. 8 is a detailed process flow diagram that illustrates a process for automatic certificate retrieval/forwarding and revocation in VOIP communications, in accordance with an embodiment of the present invention.

FIG. 8 is a detailed process flow diagram that illustrates a process for automatic certificate retrieval/forwarding and revocation in a VOIP communication, in accordance with an embodiment of the present invention. In FIG. 8, in accordance with an embodiment of the present invention, a user may initiate a VOIP call by sending (805) a call request, for example, a SIP Invite-message, to a called party. The SIP invite-message may also be in a message that may be digitally signed by the caller and sent with a caller's certificate. The SIP invite-message may be intercepted/received at a SIP proxy server, which, in turn, may transmit (810) a digitally-signed request for a current location of the called party. The request for the current location may be transmitted to a location server, which may send a request to an OCSP responder or other certificate status service to verify (815) the caller and called party certificates stored at the location server. The location server may also act as the OCSP responder and/or a CRL repository in embodiments of the present invention. The OCSP may send (820) a verification/non-verification acknowledgement of the caller and called party certificates back to the location server. If the certificates are verified, the location server may return (825) to the SIP proxy server the current location and verification copies of the called party's and the caller's certificates. The verification copies of the certificates may be returned in a LS-signed digital message. If the certificates are NOT verified, the location server may return nothing (830) to the proxy server.

In FIG. 8, upon receipt/non-receipt of the verification copies of the certificates, the proxy server may forward (835) the SIP Invite-message to the called party at the current location of the called party with or without the verification copy of the caller's certificate. The SIP Invite-message and verification copy of the caller's certificate, if received, may be forwarded (835) in a PS-signed digital message from the proxy server. Since the called party, generally, should already have it's own certificate, the received verification copy of the called party's certificate need not be sent by the proxy server to the called party. The called party may send (840) back to the SIP proxy server an OK-message, either with or without the called party's certificate, to indicate the called party's willingness to accept the call. The OK-message may be signed by the called party. The called party's signature may be verified (845) upon receipt by the SIP proxy server of the OK-message. If the called party's signature is verified, the SIP proxy server may forward (850) to the caller the OK-message along with the called party's verified certificate and digital signature. Upon receipt of the OK-message, called party's certificate and digital signature from the SIP proxy server, the caller may send (855) an acknowledgement message (ACK-message) with a nonce and a session key to the called party to complete the call. A nonce may be a piece of information, for example, a number, that may be used only once. The nonce may be a parameter that varies with time, for example, a time stamp or a special marker. The call may continue between the calling party and called party until one or both discontinue the call.

In FIG. 8, if the called party's signature is NOT verified (845), the SIP proxy server may send (860) a request to the OCSP to re-verify the called party's certificate. Upon receipt of the request, the OCSP may return (865) a status-verification message to indicate whether the certificate is valid or not valid. If the status-verification message indicates that the certificate is valid, the SIP proxy server may forward (850) to the caller the OK-message along with the called party's verified certificate and digital signature and the call can be completed as described above. However, if the status-verification message indicates that the certificate is NOT valid, the SIP proxy server may return (870) to the called party an error message to request that the called party return either: a signed OK-message with a valid certificate or the OK-message with a valid certificate attached. The called party may re-send (840) back to the SIP proxy server the signed OK-message, either with the called party's valid certificate or the OK-message with the called party's valid certificate attached. The process may continue by verifying (845) the called party's signature and the call can be completed as previously described.

Figure 9:
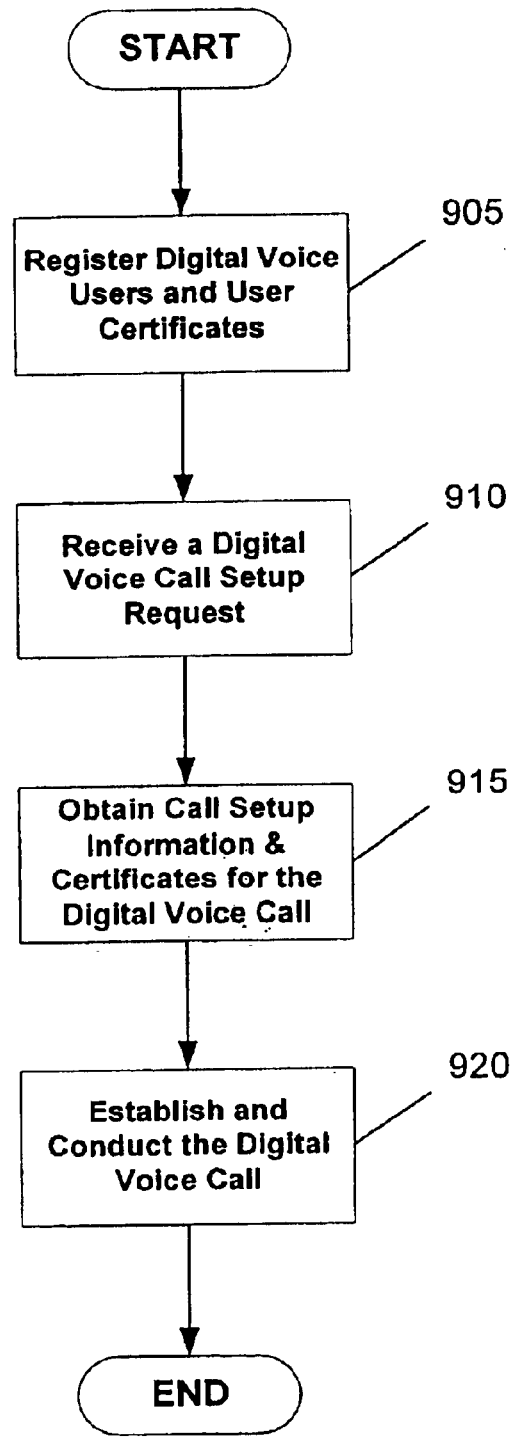
FIG. 9 is a top-level flow diagram that illustrates a method of certificate registration and automatic retrieval/forwarding and revocation in VOIP communications, in accordance with an embodiment of the present invention.

FIG. 9 is a top-level flow diagram that illustrates a method of certificate registration and automatic retrieval/forwarding and revocation in a VOIP communications, in accordance with an embodiment of the present invention. In FIG. 9, digital voice users and their associated user certificates may be registered (905) to use a system that provides VOIP communications. The registration may be performed in a communication system by, for example, a registration server/proxy registrar located in automatic certificate retrieval system 140 of FIG. 1. In FIG. 9, a digital voice call setup request may be received (910), for example, at a gateway located in automatic certificate retrieval system 140 of FIG. 1, the gateway may mediate calls between users of the system. Returning to FIG. 9, call setup information and certificates for the digital voice call may be obtained (915), for example, by the gateway. The certificates may be for a caller and a called party that may be identified in the digital voice call setup. The digital voice call may be established and conducted (920) between the caller and the called party and then end upon termination of the digital voice call. As described above, the method may be practiced using a wide variety of system configurations, for example, those configurations shown in FIGS. 1 through 5 and described above. Therefore, the specific example method and system configuration described above is merely illustrative of the general operation of the broad method and in no way should it be interpreted to limit the application of the method to the specific system described.

Figure 10:
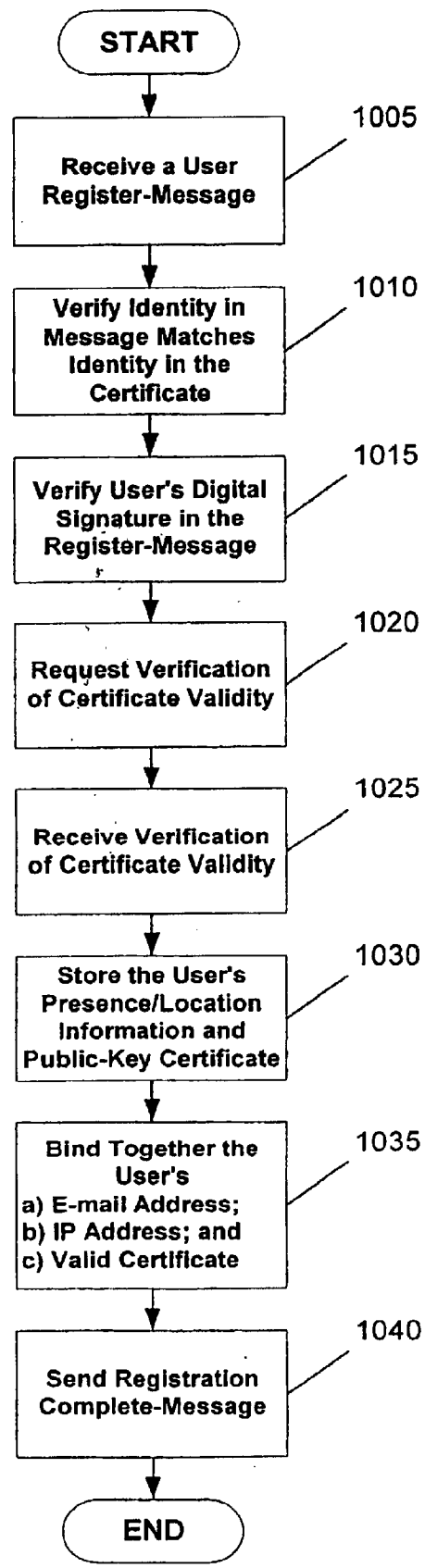
FIG. 10 is a detailed flow diagram that illustrates a method of certificate registration in a VOIP communications, in accordance with an embodiment of the present invention.

FIG. 10 is a detailed flow diagram that illustrates a method of certificate registration in a VOIP communications, in accordance with an embodiment of the present invention. In FIG. 10, a user register-message with a public-key certificate that may be signed by the user may be received (1005), for example, by a registration server/proxy registrar located in automatic certificate retrieval system 140 of FIG. 1. In FIG. 10, whether an identity that is asserted in the register-message matches an identity in the public-key certificate may be verified (1010), for example, by the registration server. A user's signature in the user register-message also may be verified (1015), for example, by the registration server. Verification of the validity of the public-key certificate may be requested (1020), for example, by the registration server. Verification of the validity of the public-key certificate may be received (1025), for example, by the registration server. The user's presence/location information and public-key certificate may be stored (1030), for example, at a location server located in automatic certificate retrieval system 140 of FIG. 1. In FIG. 10, the user's name/identity, for example, e-mail address, may be bound (1035) to the user's IP address (location), as-well-as, the user's name/identity and IP address also may be bound (1035) to the user's validated certificate. The method may further send (1040) a registration complete-message to the user to indicate a successful registration and then end. As described above, the method may be practiced using a wide variety of system configurations, for example, those shown in FIGS. 1 through 5 and described above. Therefore, the specific example method and system configuration described above is merely illustrative of the general operation of the broad method and in no way should it be interpreted to limit the application of the method to the specific system described.

FIG. 11 is a detailed flow diagram that illustrates a method of automatic certificate retrieval/forwarding and revocation in VOIP communications, in accordance with an embodiment of the present invention. In FIG. 11, a digital voice call setup request with an associated caller certificate may be received (1105), for example, by a gateway such as proxy server 342 in automatic certificate retrieval system 140 of FIG. 3. In FIG. 11, a location of a called party identified in the digital voice call setup request may be determined (1110), for example, by proxy server 342. The digital voice call setup request along with the associated caller certificate may be transmitted (1115) to the called party, for example, from proxy server 342. In addition, proxy server 342 may transmit its signature with the digital call setup request and associated caller certificate. A called party acceptance message may be received (1120), for example, by proxy server 342, from the called party. In general, the called party acceptance message indicates the called party's ability and/or willingness to receive a digital voice call from the caller. Similarly, the called party acceptance message may be accompanied by a called party certificate and may be signed by the called party. The received called party acceptance message may be verified (1125), for example, by proxy server 342. As previously described, if the called party acceptance message can not be verified, for example, the called party's certificate can not be verified, proxy server 342 may request that the called party resubmit the acceptance message and called party certificate. The called party acceptance message and the called party certificate may be transmitted (1130), for example, from proxy server 342 to the caller, and the method may end. As described above, the method may be practiced using a wide variety of system configurations, for example, those configurations shown in FIGS. 1 through 5 and described above. Therefore, the specific example method and system configuration described above is merely illustrative of the general operation of the broad method and in no way should it be interpreted to limit the application of the method to the specific system described.

In accordance with an embodiment of the present invention, a method for communicating over a network includes receiving a digital voice call setup request being associated with a caller certificate from a caller, and determining a location of a called party identified in the digital voice call setup request. The method further includes transmitting the digital voice call setup request with the caller certificate to the called party, receiving a called party acceptance message, verifying the called party acceptance message, and transmitting the called party acceptance message and a called party certificate to the caller.

In accordance with an embodiment of the present invention, a medium storing instructions adapted to be executed by a processor, that if executed, the instructions configure the processor to receive a digital voice call setup request being associated with a caller certificate from a caller, determine a location of a called party identified in the digital voice call setup request, and transmit the digital voice call setup request with the caller certificate to the called party. The instructions further configure the processor to receive a called party acceptance message, verify the called party acceptance message, and transmit the called party acceptance message and a called party certificate to the caller.

In accordance with an embodiment of the present invention, a system for providing digital certificate registration and automatic certificate retrieval in a voice over Internet protocol (VOIP) communications system includes a VOIP gateway configured to receive a digital voice call setup request that is associated with a caller certificate from a caller, determine a location of a called party identified in the digital voice call setup request, transmit the digital voice call setup request with the caller certificate to the called party, receive a called party acceptance message, verify the called party acceptance message, and transmit the called party acceptance message and a called party certificate to the caller.

In accordance with an embodiment of the present invention, an apparatus for establishing communications over a network, may include a processor and a memory coupled to the processor, with the memory storing call setup instructions adapted to be executed by the processor to perform the method in accordance with an embodiment of the present invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of communicating over a network comprising:

receiving a digital voice call setup request associated with a caller certificate from a caller;

determining a location of a called party identified in said digital voice call setup request by:

transmitting a request to a location server for said location, said request including an identifier of the called party and a signature of the caller; and receiving a location response from said location server, said location response including said location for said called party called party certificate and said caller certificate;

transmitting said digital voice call setup request with said caller certificate to said called party;

receiving a called party acceptance message;

verifying said called party acceptance message; and transmitting said called party acceptance message and said called party certificate to said caller.

2. The method of claim 1 wherein said receiving a digital voice call setup request comprises:

receiving a voice over Internet protocol (VOIP) call setup request that is associated with said caller certificate from said caller.

3. The method of claim 1 wherein said digital voice call setup request comprises:

a caller Internet protocol (IP) address; and a called party IP address.

4. The method of claim 1 wherein said digital voice call setup is associated with a caller signature.

5. The method of claim 1 wherein said location response comprises a signature of said location server.

6. The method of claim 1 wherein said digital voice call setup request further comprises a signature of said caller.

7. The method of claim 1 wherein said called party acceptance message comprises a called party signature.

8. The method of claim 1 wherein said verifying said called party acceptance message comprises at least one of:

verifying said called party certificate attached to said acceptance message; and verifying a previously received called party certificate.

9. The method of claim 8 wherein said previously received called party certificate was received with said location for said called party.

10. The method of claim 1 further comprising:

transmitting a called party signature to said caller.

11. The method of claim 1 further comprising registering said caller and said called party with a digital voice communications system on the network.

12. The method of claim 11 wherein registering said caller and said called party comprises receiving:

a user name;

a user IP address;

a user public-key certificate; and a user digital signature.

13. The method of claim 12, further comprising:

verifying said user name is the same as a user name in said user public-key certificate;

verifying said user digital signature; and verifying that said user public-key certificate is valid.

14. The method of claim 13, further comprising:

binding said received user name to said user IP address; and binding said validated user public-key certificate to said bound user name and user IP address.

15. The method of claim 14, comprising:

returning an OK message if the caller registration is successful.

16. The method of claim 11, wherein said registering occurs prior to receipt of said digital voice call setup request.

17. The method of claim 16 wherein said registering comprises:

transmitting a separate digital voice call setup request with said caller certificate to said called party;

receiving a separate acceptance message from said called party;

verifying said separate called party acceptance message; and transmitting said separate called party acceptance message and a separate called party certificate to said caller.

18. The method of claim 11, wherein said registering occurs after said digital voice call setup request is received.

19. A medium storing instructions adapted to be executed by a processor, when executed, the instructions to configure the processor to:

receive a digital voice call setup request being associated with a caller certificate from a caller;

determine a location of a called party identified in said digital voice call setup request by:

transmit a request to a location server for said location, said request including an identifier of the called party and a signature; and receive a location response from said location server, said location response including said location for said called party, a called party certificate and said caller certificate;

transmit said digital voice call setup request with said caller certificate to said called party;

receive a called party acceptance message;

verify said called party acceptance message; and transmit said called party acceptance message and said called party certificate to said caller.

20. The medium as defined in claim 19 wherein said receive a digital voice call setup request configures the processor to:

receive a voice over Internet protocol (VOIP) call setup request that is associated with said caller certificate from said caller.

21. The medium as defined in claim 19 wherein said receive a digital voice call setup request configures the processor to:

receive said digital voice call setup request from a caller Internet protocol (IP) address, said digital voice call setup request having said caller certificate associated therewith and being directed to a called party IP address.

22. The medium as defined in claim 19 wherein said receive a digital voice call setup request further configures the processor to:

receive said digital voice call setup request with a caller signature.

23. The medium as defined in claim 19 wherein said receive said location response further configures the processor to receive a signature of said location server.

24. The medium as defined in claim 19 wherein said transmit said digital voice call setup request configures the processor to:

transmit said digital voice call setup request with a signature.

25. The medium as defined in claim 19 wherein said receive said called party acceptance message configures the processor to receive a called party signature with said called party acceptance message.

26. The medium as defined in claim 19 wherein said verify said called party acceptance message configures the processor to verify a called party signature received with said called party acceptance message using one of:
  said called party certificate attached to said acceptance message; and
  a previously received called party certificate.

27. The medium as defined in claim 26 wherein said previously received called party certificate was received with said location for said called party.

28. The medium as defined in claim 19 wherein the processor is further configured to:
  transmit a called party signature to said caller.

29. The medium as defined in claim 19 wherein the processor is further configured to:
  register said caller and said called party with a digital voice communications system.

30. The medium as defined in claim 29 wherein said register said caller and said called party configures the processor to:
  receive a user name;
  receive a user IP address;
  receive a user public-key certificate; and
  receive a user digital signature.

31. The medium as defined in claim 30 wherein said processor is further configured to:
  verify said user name is the same as a user name in said user public-key certificate;
  verify said user digital signature; and
  verify that said user public-key certificate is valid.

32. The medium as defined in claim 31 wherein said processor is further configured to:
  bind said received user name to said user IP address; and
  bind said validated user public-key certificate to said bound user name and user IP address.

33. The medium as defined in claim 32 wherein said processor is further configured to:
  return an OK message, if the caller registration is successful.

34. A system for providing digital certificate registration and automatic certificate retrieval in a voice over Internet protocol (VOIP) communications system, said system comprising:
  a VOIP gateway, said VOIP gateway to:
    receive a digital voice call setup request that is associated with a caller certificate from a caller;
    determine a location of a called party identified in said digital voice call setup request by:
      transmit a request to a location server for said location, said request including an identifier of the called party and a signature; and
      receive a location response from said location server, said location response including said location for said called party, a called party certificate and said caller certificate;
    transmit said digital voice call setup request with said caller certificate to said called party;
    receive a called party acceptance message;
    verify said called party acceptance message; and
    transmit said called party acceptance message and said called party certificate to said caller.

35. The system as defined in claim 34 wherein said VOIP gateway comprises:
  a session initiation protocol (SIP) proxy server in communication with said VOIP communication system, said SIP proxy server to enable communication between said caller and said called party.

36. The system as defined in claim 35 wherein said VOIP gateway further comprises at least one of:
  a location server in communication with said SIP proxy server;
  at least one alternative proxy server in communication with said SIP proxy server;
  a certificate lookup facility, in communication with said SIP proxy server; and
  an online certificate status protocol (OCSP) responder in communication with said SIP proxy server.

37. The system as defined in claim 35 wherein said VOIP gateway further comprises:
  a location server in communication with said SIP proxy server;
  a location database in communication with said location server, said location database including a current location for said called party, said called party certificate and said caller certificate; and
  a certificate authority in communication with said location server and said SIP proxy server.

38. An apparatus for establishing communications over a network, comprising:
  a processor; and
  a memory coupled to said processor, said memory storing call setup instructions to be executed by said processor to perform steps including:
    receiving a digital voice call setup request being associated with a caller certificate from a caller;
    determining a location of a called party identified in said digital voice call setup request by:
      transmitting a request to a location server for said location, said request including an identifier of the called party and a signature of the caller; and
      receiving a location response from said location server, said location response including said location for said called party, a called party certificate and said caller certificate;
    transmitting said digital voice call setup request with said caller certificate to said called party;
    receiving a called party acceptance message;
    verifying said called party acceptance message; and
    transmitting said called party acceptance message and said called party certificate to said caller.

39. A system for providing digital certificate registration and automatic certificate retrieval in a voice over Internet protocol (VOIP) communications system, said system comprising:
  a VOIP gateway, said VOIP gateway including:
    means for receiving a digital voice call setup request being associated with a caller certificate from a caller;
    means for determining a location of a called party identified in said digital voice call setup request, said means for determining including:
      means for transmitting a request to a location server for said location, said request including an identifier of the called party and a signature; and
      means for receiving a location response from said location server, said location response including said location for said called party, a called party certificate and said caller certificate;
    means for transmitting said digital voice call setup request with said caller certificate to said called party;
    means for receiving a called party acceptance message;

means for verifying said called party acceptance message; and means for transmitting said called party acceptance message and said called party certificate to said caller.

40. An apparatus for establishing communications over a network, comprising:

means for processing; and means for storing coupled to said processing means, said storing means storing call setup instructions to be executed by said processing means to perform steps including:

receiving a digital voice call setup request being associated with a caller certificate from a caller;

determining a location of a called party identified in said digital voice call setup request by:

transmitting a request to a location server for said location, said request including an identifier of the called party and a signature; and receiving a location response from said location server, said location response including said location for said called party, a called party certificate and said caller certificate;

transmitting said digital voice call setup request with said caller certificate to said called party;

receiving a called party acceptance message;

verifying said called party acceptance message; and transmitting said called party acceptance message and said called party certificate to said caller.

* * * * *

UNITED STATES PATENT AND TRADEMARK OFFICE
CERTIFICATE OF CORRECTION

PATENT NO. : 6,842,449 B2 Page 1 of 1
DATED : January 11, 2005
INVENTOR(S) : Thomas Hardjono It is certified that error appears in the above-identified patent and that said Letters Patent is hereby corrected as shown below:

<u>Column 13,</u>
Line 6, change "said called party called party certificate" to -- said called party, a called party certificate --.

Signed and Sealed this

Sixth Day of September, 2005

JON W. DUDAS
*Director of the United States Patent and Trademark Office*